US008130679B2

(12) United States Patent
Milstein et al.

(10) Patent No.: US 8,130,679 B2
(45) Date of Patent: Mar. 6, 2012

(54) INDIVIDUAL PROCESSING OF VOIP CONTEXTUAL INFORMATION

(75) Inventors: David Milstein, Redmond, WA (US); Kuansan Wang, Bellevue, WA (US); Lon-Chan Chu, Redmond, WA (US); Michael D Malueg, Renton, WA (US); Linda Criddle, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1308 days.

(21) Appl. No.: 11/442,187

(22) Filed: May 25, 2006

(65) Prior Publication Data

US 2007/0276665 A1 Nov. 29, 2007

(51) Int. Cl.
*H04L 12/16* (2006.01)
*H04J 1/02* (2006.01)

(52) U.S. Cl. ......................... 370/265; 370/401; 370/493

(58) Field of Classification Search ........................ None
See application file for complete search history.

(56) References Cited

U.S. PATENT DOCUMENTS 5,881,105 A * 3/1999 Balachandran et al. ...... 370/498
(Continued)

*Primary Examiner* — Chirag Shah
*Assistant Examiner* — Joshua Smith
(74) *Attorney, Agent, or Firm* — Merchant & Gould

(57) ABSTRACT

A method and system for processing received VoIP data packets based on preferences of a recipient client or capabilities of a recipient computing device is provided. Several users and/or service providers are allowed to specify rules instructing how to process contextual information upon receipt of the contextual information. More specifically, a recipient computing device may have contextual processing rules specified based on its individual need and capability. The contextual processing rules may indicate what application can be used on a certain type of contextual information. Based on the contextual processing rules, the contextual information may be stored in local storage of the recipient computing device or forwarded to another device. In this manner, each recipient computing device of the recipient client can process contextual information based on its need and capability.

20 Claims, 15 Drawing Sheets

U.S. PATENT DOCUMENTS

| | | | | |
|---|---|---|---|---|
| 6,006,332 | A | 12/1999 | Rabne et al. | 726/6 |
| 6,157,640 | A * | 12/2000 | Valentine | 370/384 |
| 6,259,710 | B1 * | 7/2001 | Junghans | 370/522 |
| 6,452,911 | B1 * | 9/2002 | Seo | 370/335 |
| 6,724,740 | B1 * | 4/2004 | Choi et al. | 370/335 |
| 6,751,211 | B1 | 6/2004 | Chack | 370/352 |
| 6,804,224 | B1 * | 10/2004 | Schuster et al. | 370/352 |
| 6,904,132 | B2 | 6/2005 | Reynolds | 379/88.16 |
| 6,925,487 | B2 | 8/2005 | Kim | 709/203 |
| 7,720,681 | B2 | 5/2010 | Milstein et al. | 704/244 |
| 2002/0021352 | A1 * | 2/2002 | Sato | 455/411 |
| 2002/0095462 | A1 | 7/2002 | Beck et al. | 709/204 |
| 2002/0105936 | A1 * | 8/2002 | Aoki | 370/342 |
| 2002/0152288 | A1 | 10/2002 | Hora et al. | 709/219 |
| 2003/0118038 | A1 * | 6/2003 | Jalava et al. | 370/401 |
| 2003/0133553 | A1 | 7/2003 | Khakoo et al. | 379/142.01 |
| 2004/0076155 | A1 * | 4/2004 | Yajnik et al. | 370/389 |
| 2004/0179551 | A1 * | 9/2004 | Lentine et al. | 370/480 |
| 2004/0209604 | A1 | 10/2004 | Urban et al. | 455/415 |
| 2004/0213207 | A1 | 10/2004 | Silver et al. | 370/352 |
| 2005/0114137 | A1 * | 5/2005 | Saito et al. | 704/260 |
| 2005/0129054 | A1 * | 6/2005 | Venkatachalam et al. | 370/458 |
| 2005/0201353 | A1 * | 9/2005 | Lee et al. | 370/349 |
| 2005/0207392 | A1 * | 9/2005 | Sivalingham et al. | 370/349 |
| 2006/0045039 | A1 * | 3/2006 | Tsuneya et al. | 370/318 |
| 2006/0069765 | A1 * | 3/2006 | Okamura | 709/223 |
| 2006/0092921 | A1 * | 5/2006 | Narayanan et al. | 370/352 |
| 2006/0153238 | A1 * | 7/2006 | Bar-On et al. | 370/473 |
| 2006/0187850 | A1 * | 8/2006 | Ward et al. | 370/352 |
| 2006/0187900 | A1 * | 8/2006 | Akbar | 370/352 |
| 2007/0140224 | A1 * | 6/2007 | Cheng et al. | 370/352 |
| 2008/0117897 | A1 | 5/2008 | Criddle et al. | 370/389 |

* cited by examiner

INDIVIDUAL PROCESSING OF VOIP CONTEXTUAL INFORMATION

BACKGROUND

Generally described, an Internet telephony system provides an opportunity for users to have a call connection with enhanced calling features compared to a conventional Public Switched Telephone Network (PSTN) based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide a method and system to independently handle received VoIP data packets based on preferences of each recipient client or capabilities of each recipient computing device.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

A method and system for processing received VoIP data packets based on preferences of a recipient client or capabilities of a recipient computing device is provided. Several users and/or service providers are allowed to specify rules instructing how to process contextual information upon receipt of the contextual information. More specifically, a recipient computing device may have contextual processing rules specified based on its individual need and capability. The contextual processing rules may indicate what application can be used on a certain type of contextual information. Based on the contextual processing rules, the contextual information may be stored in local storage of the recipient computing device or forwarded to another device. In this manner, each recipient computing device of the recipient client can process contextual information based on its need and capability.

In accordance with an aspect of the invention, a method for individual processing of contextual information relating to a conversation on a communication channel is provided. Contextual information may be obtained by a recipient computing device. Upon receipt of the contextual information, a set of rules for processing such contextual information may be identified. The set of rules may have been specifically predefined for the recipient computing device. A determination is made as to whether additional information is needed for the identified set of rules. If the additional information is needed, the additional information is obtained from a proper source, including but not limited to, local storage, a service provider, a third party service provider, and other VoIP clients. The set of rules may be applied to the received contextual information to process that information. If the computing device does not have proper functionalities or capacities to process the received contextual information, a subset or all of the contextual information may be stored in local storage of the recipient computing device. Alternatively, a subset or all of the contextual information may be stored in a destination repository. A request to store the contextual information may be generated and forwarded along with the contextual information to the destination repository. Further, the set of rules may identify a next destination in a predetermined communication path and the contextual information may be forwarded to the next destination. In some instances, the set of rules may identify an appropriate application to execute on the received contextual information. In such instances, the appropriate application is obtained from local storage or a proper source and executed on the contextual information.

In accordance with another aspect of the present invention, a computer-readable medium having computer-executable components for initial processing of contextual information relating to a conversation on a communication channel is provided. The computer-executable components include a communication component for obtaining contextual information and for forwarding the obtaining contextual information. The computer-executable components further include a processing component for identifying a set of rules relating to the obtained contextual information and for applying the set of rules on the obtained contextual information. The processing component may identify an appropriate application based one the set of rules and execute the appropriate application on the obtained contextual information. The communication component may query the appropriate application from a proper source if the appropriate application is not locally available. The processing component may determine whether additional information is necessary to apply the set of rules on the contextual information and, upon determination, the communication component may obtain the additional information. The computer-executable components also include a storage component for storing the set of rules, the subset of the contextual information, the processed contextual information, the log information of the processing of the contextual information, and the like.

In accordance with yet another aspect of the invention, a method for processing contextual information upon receipt is provided. A recipient computing device receives contextual information and identifies a corresponding set of rules to process the contextual information. If the recipient device determines that the contextual information will not be processed on the recipient computing device, the contextual information may be stored in local storage or an external repository. Alternatively, the received contextual information may be forwarded to a proper destination for further processing and the processed contextual information may be received in return. If the recipient computing device determines that the contextual information will be processed on the recipient computing device, an appropriate application may be identified based on the set of rules. The appropriate application may be executed on the contextual information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for processing contextual information according to a set of rules individually defined for a recipient computing device over a VoIP communication channel. More specifically, the present invention relates to a method and system for processing received contextual information based on a set of rules that has been defined for a specific computing device of a VoIP client, a service provider, etc. Contextual information is defined by corresponding "structured hierarchies" to be communicated. "Structured hierarchies," as used herein, are predefined organizational structures for arranging contextual information to be exchanged between two or more VoIP devices. For example, structured hierarchies may be eXtensible Markup Language (XML) namespaces. Further, a VoIP conversation includes one or more data streams of information related to a conversation, such as contextual information and voice/multimedia information, exchanged over a conversation channel. Although the present invention will be described with relation to illustrative structured hierarchies and an IP telephony environment with an emphasis on voice communication, one skilled in the relevant art will appreciate that the disclosed embodiments are illustrative in nature and should not be construed as limiting.

Figure 1:
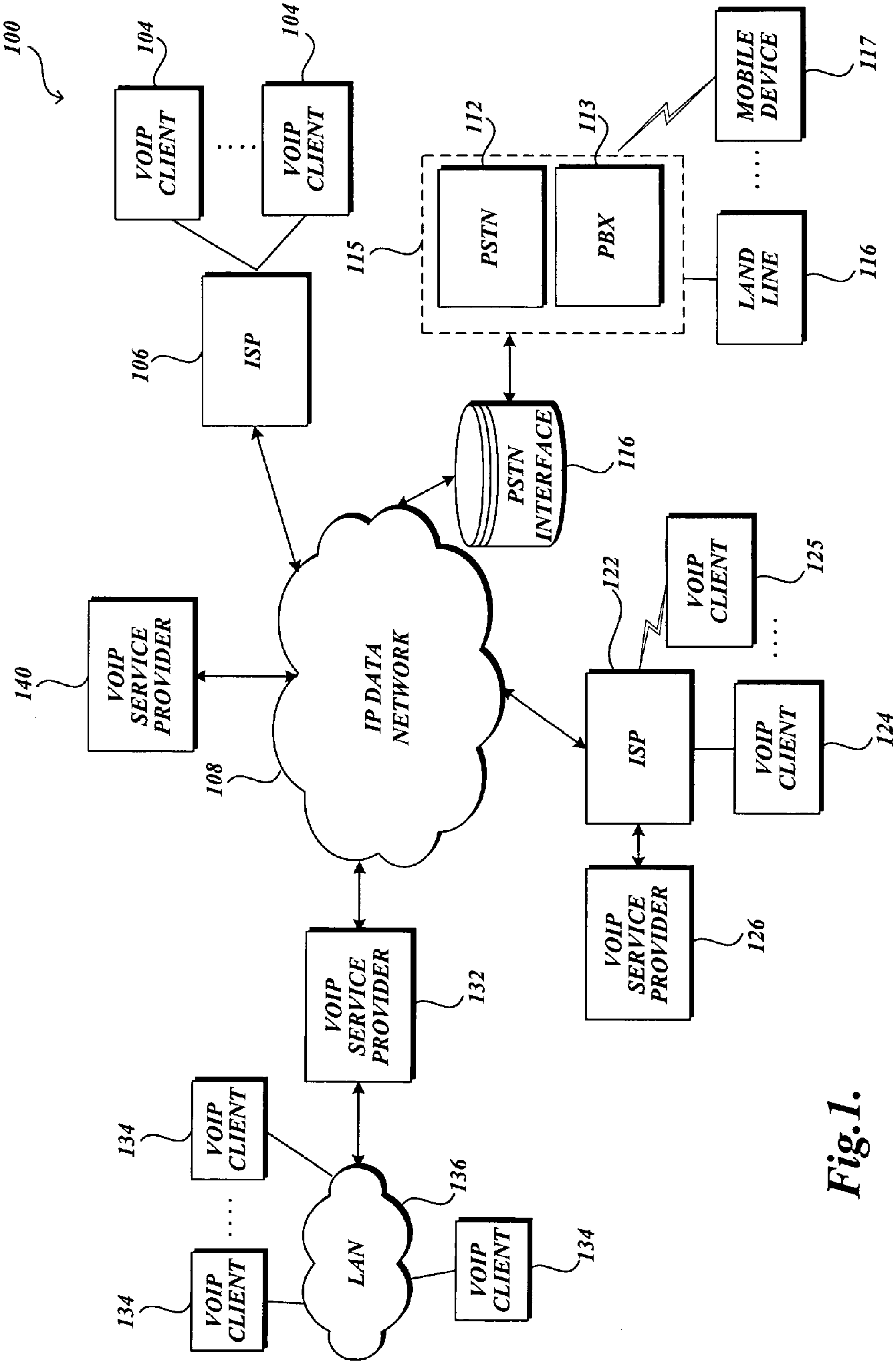
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a roBOT (BOT), a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 134 may create, maintain, and provide information relating to predetermined priorities for incoming calls.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 via PSTN 112, or Private Branch exchange (PBX) 113. A PSTN interface 114 such as a PSTN gateway may provide access between POTS/PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116, may request a connection with the VoIP client based on the unique VoIP identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
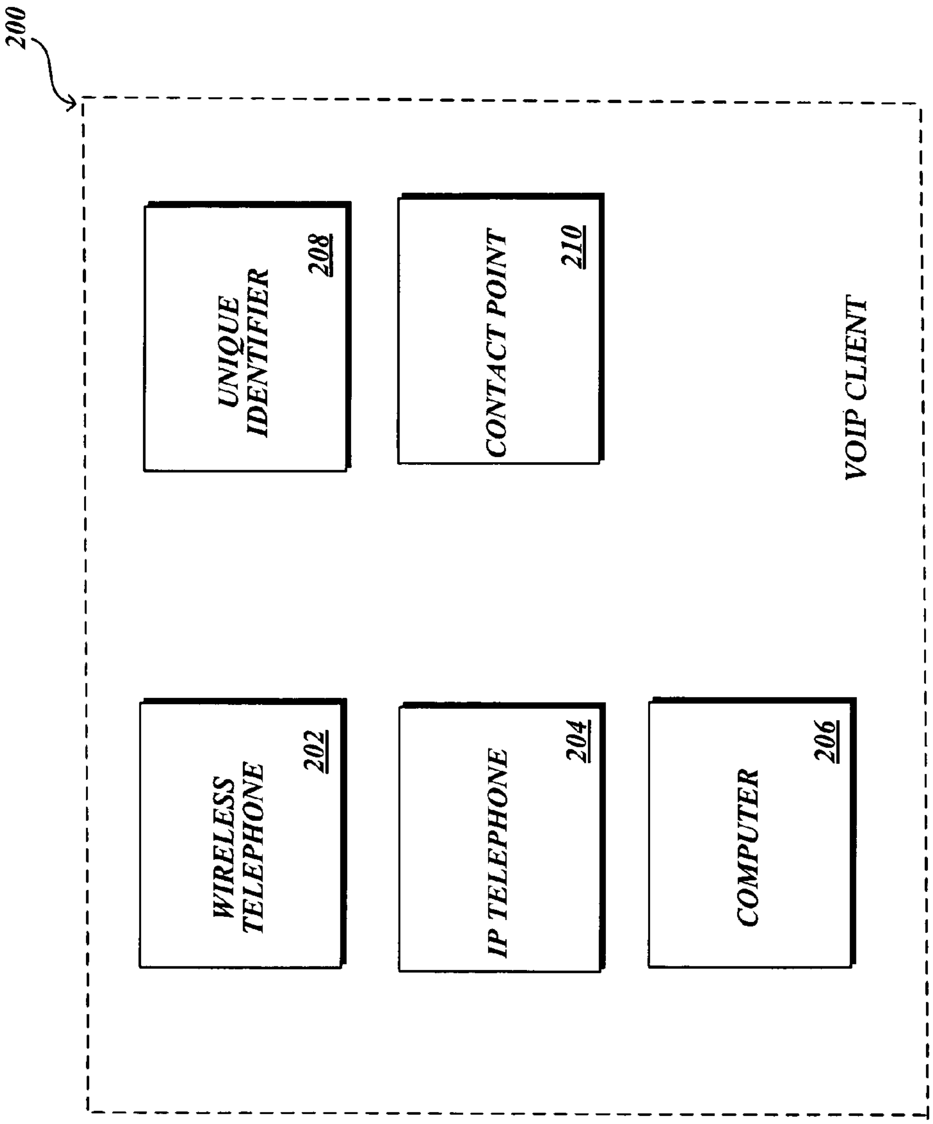
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifiers 208. The unique VoIP identifier(s) 208 may be constant or change over time. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In an alternative embodiment, the VoIP client 200 may maintain multiple VoIP identifiers where a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
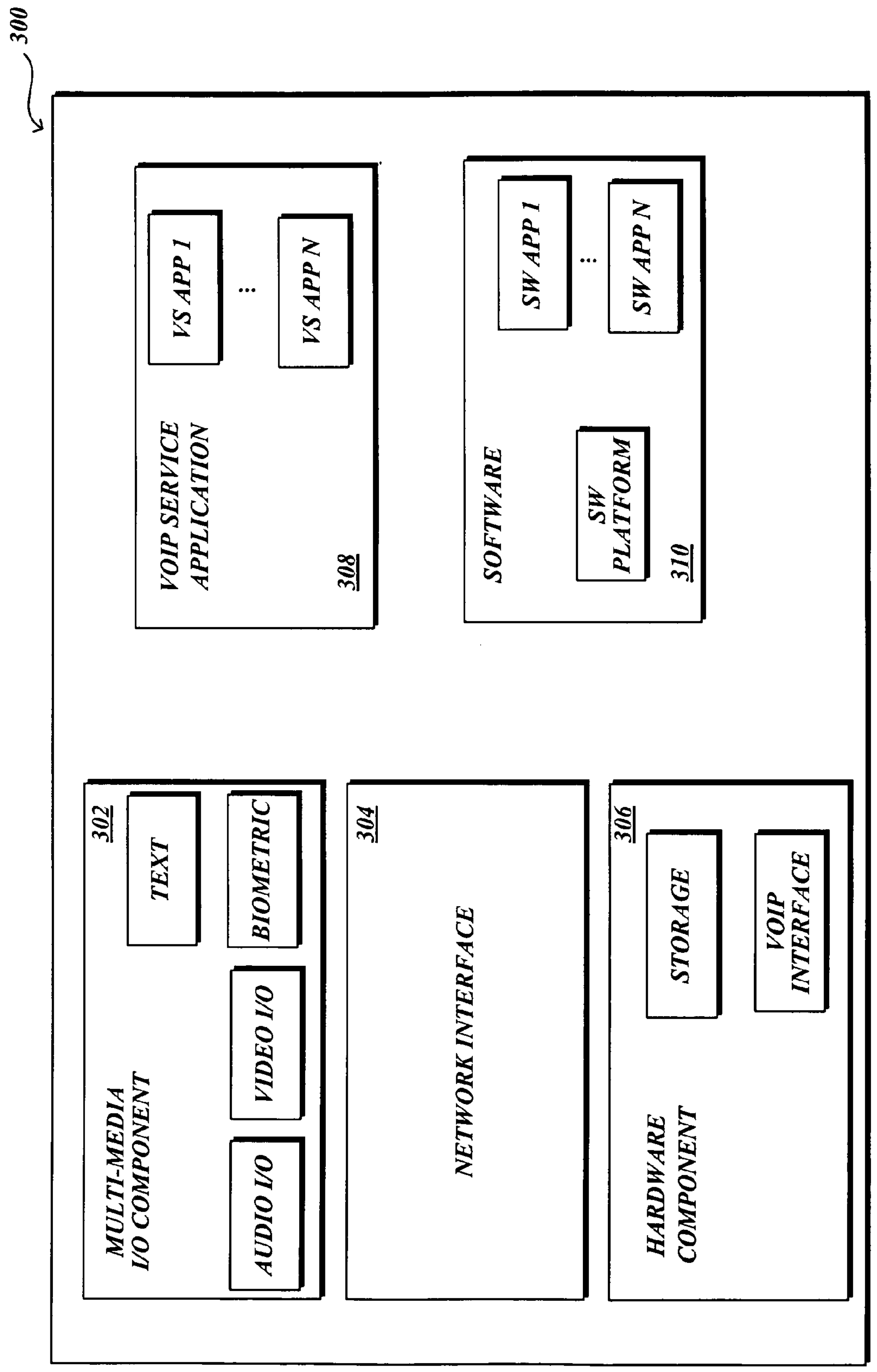
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304.

The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc.) associated with the VoIP client in which the device is included. In one embodiment, the hardware component 306 may include a VoIP interface card which allows a non-VoIP client device to transmit and receive a VoIP conversation.

The device 300 may further include a software application component (software) 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
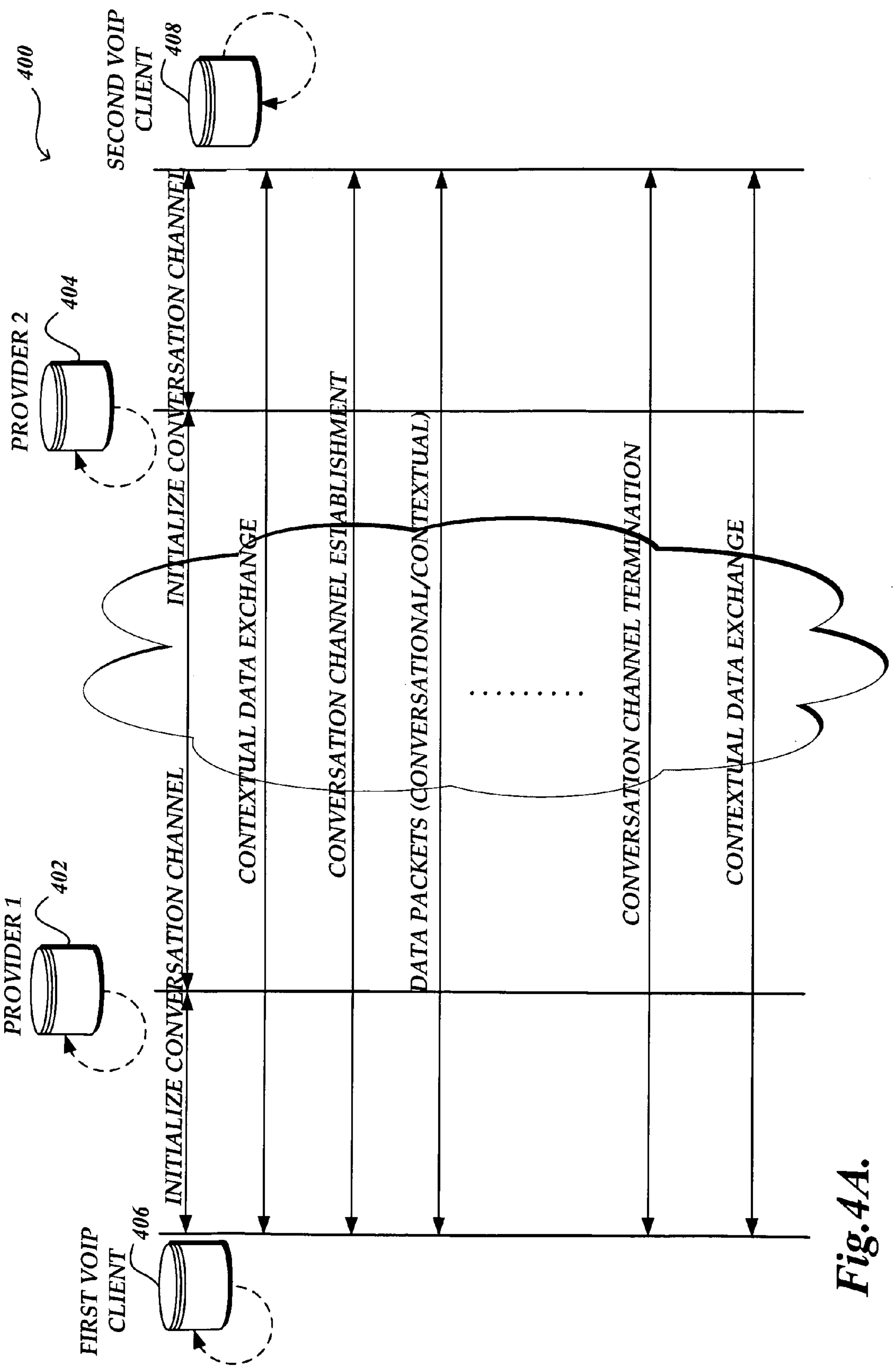
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel in accordance with an embodiment of the present invention is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer-to-peer context, communication between VoIP devices may also be direct without having any service providers involved.

There is a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that, depending on the protocol, a connection set-up phase and a connection termination phase may require additional steps in the conversation flow 400.

For ease of explanation, we will utilize the example in which the first VoIP client 406 and the second VoIP client 408 each include only one VoIP device. Accordingly, the discussion provided herein will refer to connection of the two VoIP devices. The individual using the device of the first VoIP client 406 may select or enter the unique identifier of the client that is to be called. Provider 1 402 receives the request from the device of the first VoIP client 408 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include a priority list of incoming calls from various potential calling VoIP clients, including VoIP client 406.

Available media types, rules of the calling client, the client being called, and the like may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
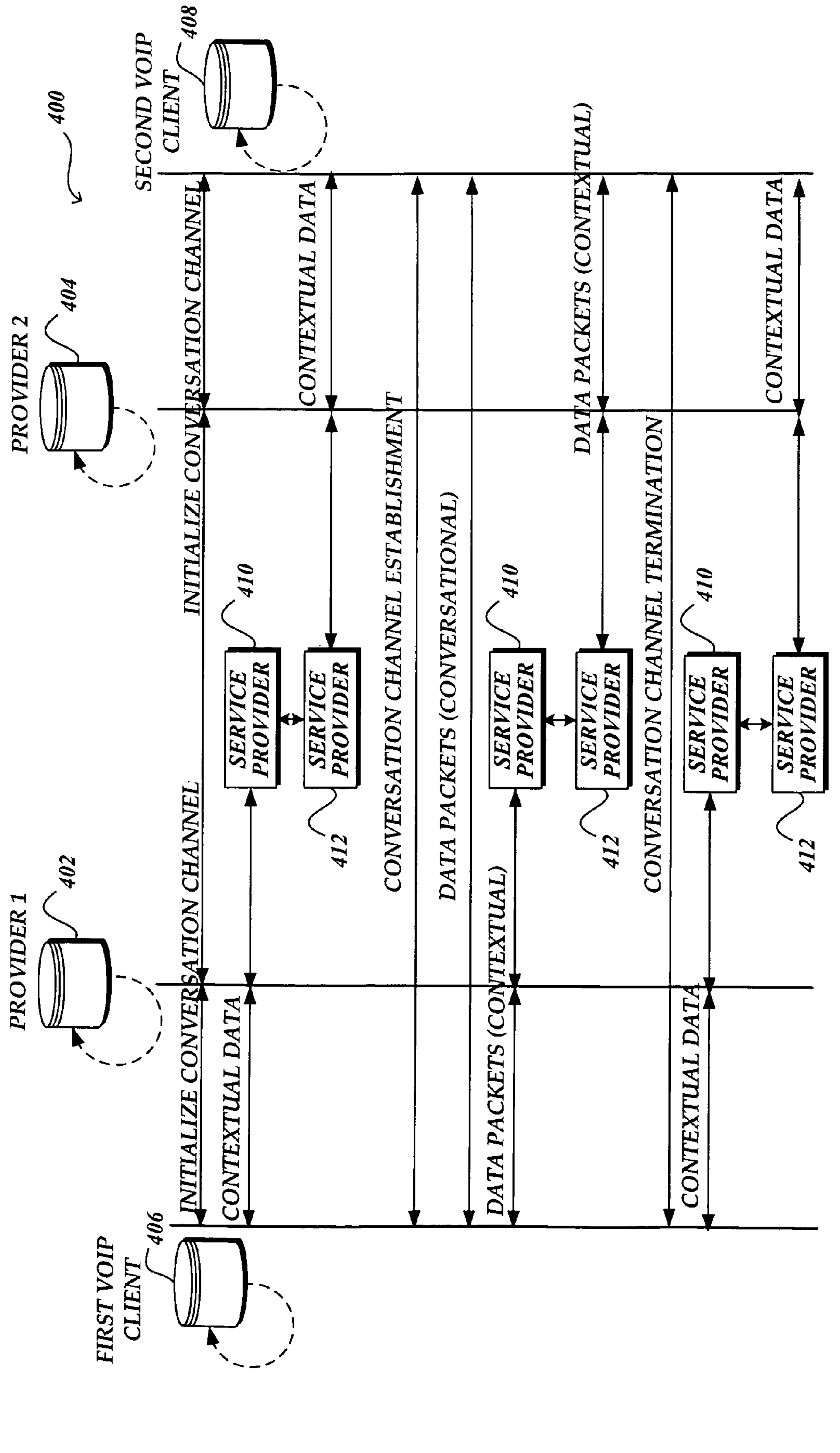

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information that Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider 1 and Provider 2), depending on the nature of the contextual information. For example, voice profiles may be collected by the service providers 402, 404 and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify, and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
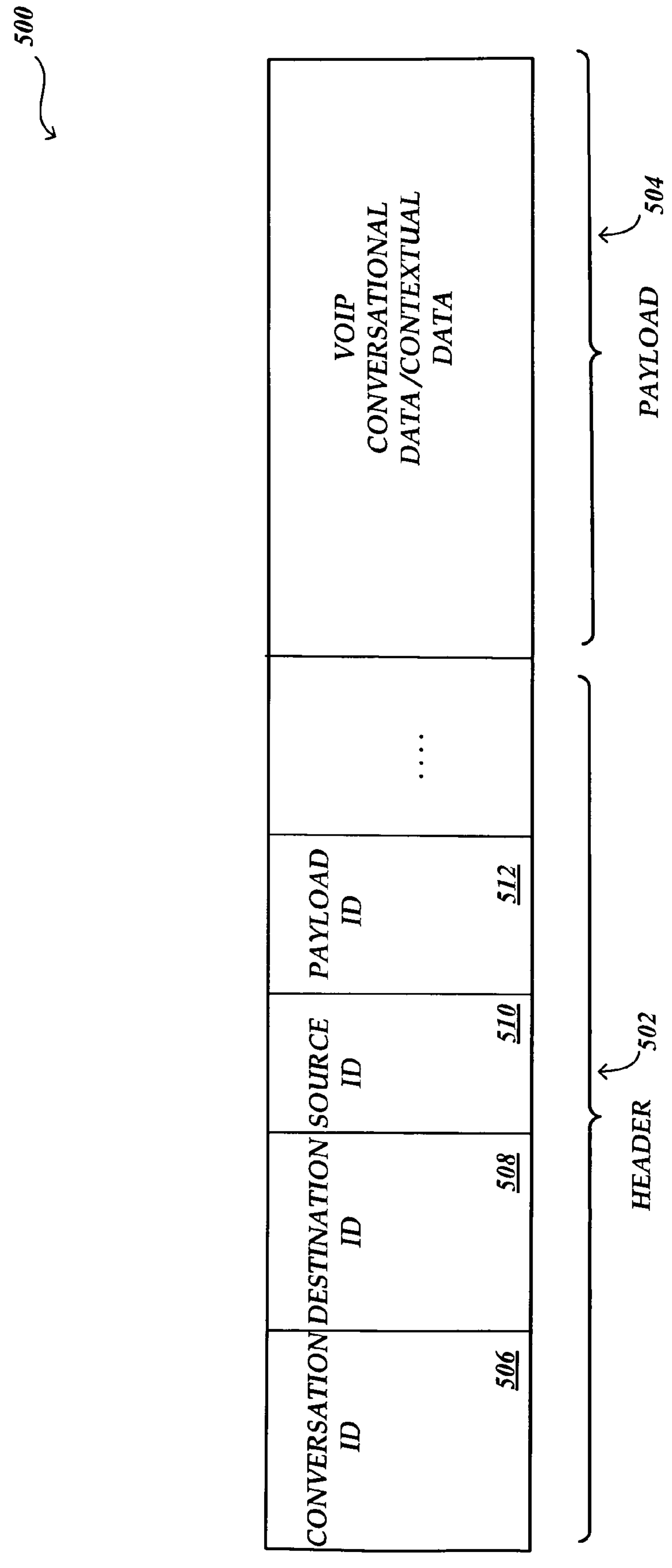
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the client's confidential information, VoIP device's functionality, VoIP service provider's information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
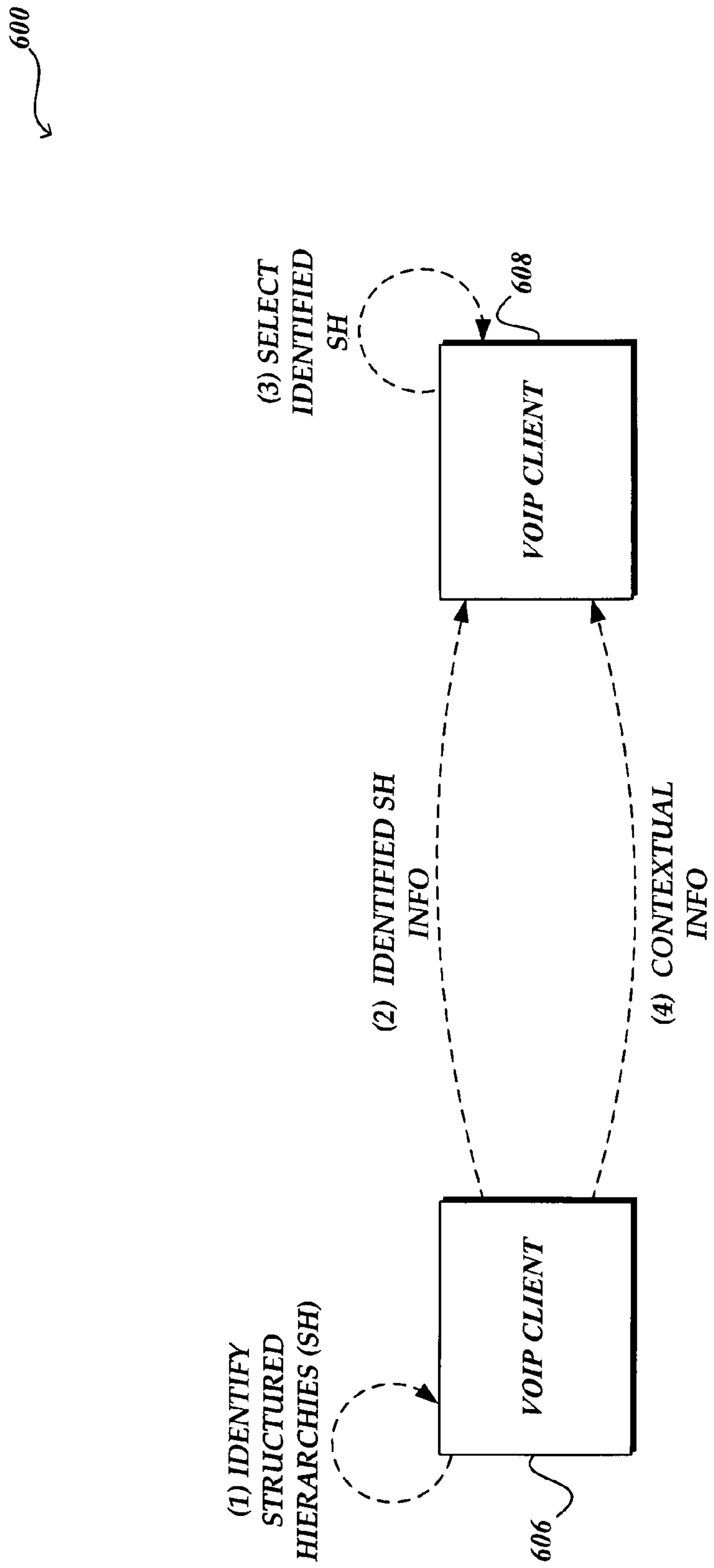
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4A, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information identifying which structured hierarchy will be used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
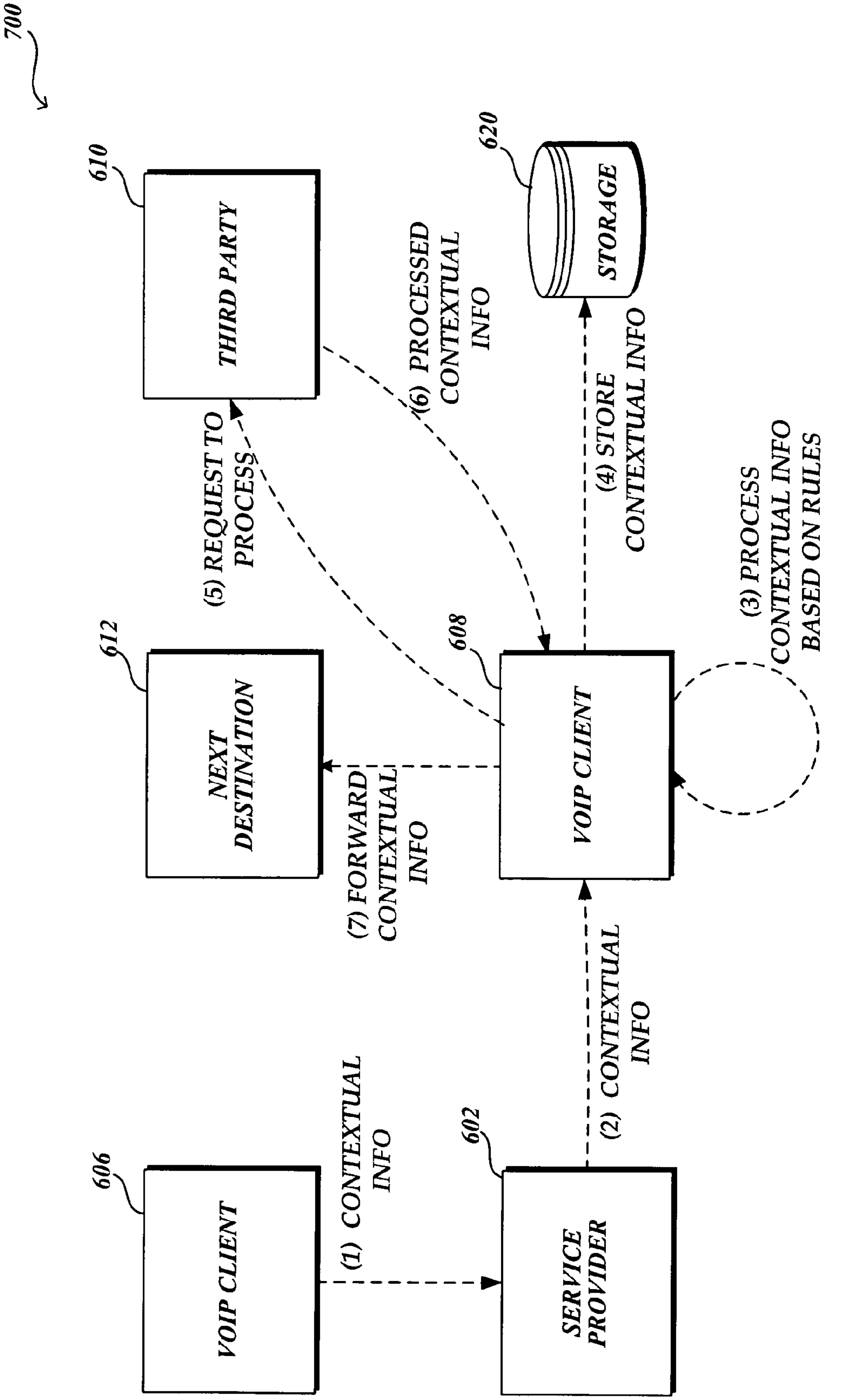
FIG. 7 is a block diagram illustrating interactions between two clients for collecting and transferring contextual information in accordance with an aspect of the present invention.

FIG. 7 is a block diagram 700 illustrating interactions among several VoIP entities for collecting and transferring contextual information via various service providers in accordance with an embodiment of the present invention. The VoIP entities may include VoIP clients 606, 608, VoIP service providers 602, third party service providers, and the like. While this example utilizes one VoIP service provider and two VoIP clients, any number and combination of VoIP clients and/or service providers may be used with embodiments of the present invention. It is also contemplated that collecting and transferring contextual information can be done numerous times before, during, and/or the end of the conversation. For discussion purposes, assume that VoIP Client 606 and VoIP Client 608 have established a conversation channel between devices of VoIP Client 606 and VoIP Client 608 via Service Provider (SP) 602.

During a conversation, SP 602 may identify contextual information that will be obtained from VoIP Client 606. VoIP Client 606 collects the identified contextual information and identifies structured hierarchies that will be used to carry the identified contextual information. The collected contextual information is transmitted from VoIP Client 606 to SP 602. SP 602 may store part of the received contextual information. Further, SP 602 may collect more contextual information, if necessary, and update the received contextual information. For example, SP 602 may add information relating to services provided for VoIP Client 608, such as billing information, rates, and the like. In addition, the information regarding the identified structured hierarchies is also transmitted from VoIP Client 606 to SP 602. As will be discussed in greater detail below, the information regarding the identified structured hierarchy may include information about which structured hierarchies are used to carry the corresponding contextual information, how to identify the structured hierarchies, and the like. SP 602 transmits the information regarding the identified structured hierarchies and the corresponding contextual information to VoIP Client 608. VoIP Client 608 may identify a set of rules defining how to process the contextual information upon receipt of the contextual information. In one embodiment, VoIP Client 608 may have a predefined set of contextual information processing rules for each device of VoIP Client 608. Based on the set of rules, VoIP Client 608 may store the received contextual information in local storage

620 of one of devices of VoIP Client 608. In an alternative embodiment, VoIP client 608 may store the received contextual information to a centralized database repository (e.g., a database server, a local storage for VoIP client 608, etc.). In one embodiment, VoIP client 608 may generate a request to process the received contextual information and send the request and the contextual information to a third party 610 (e.g., other VoIP clients, third party providers, etc.). It is to be understood that VoIP client 606 may maintain predefined logic to determine the proper third party 610 for processing the contextual information. VoIP client 606 may receive the result of the process or the processed contextual information from the third party 610. In another embodiment, VoIP client 608 may determine a next destination 612 in a predetermined communication path and forward the contextual information to the determined destination. The next destination 612 may be determined based on the received contextual information.

As discussed above, the information regarding the identified structured hierarchies corresponding to the contextual information may be received by VoIP Client 608. Upon receipt of the information regarding the identified structured hierarchies, VoIP Client 608 may look up predefined structured hierarchies to select the identified structured hierarchies for the contextual information. In one embodiment, the structured hierarchies may be defined by XML. However, it is to be appreciated that the structured hierarchies can be defined by any language suitable for implementing and maintaining extensible structured hierarchies. Generally described, XML is well known as a cross-platform, software and hardware independent tool for transmitting information. Further, XML maintains its data as a hierarchically structured tree of nodes, each node comprising a tag that may contain descriptive attributes. XML is also well known for its ability to allow extendable (i.e., vendor customizable) patterns that may be dictated by the underlying data being described without losing interoperability. Typically, an XML namespace URI is provided to uniquely identify a namespace. In some instances, the namespace may be used as a pointer to a centralized location containing default information (e.g., XML Schema) about the document type the XML is describing.

In an illustrative embodiment, VoIP client 606 may identify a XML namespace for contextual information. When multiple contexts are aggregated, appropriate XML namespaces can be declared as an attribute at the corresponding tags. It is to be understood that XML namespaces, attributes, and classes illustrated herein are provided merely as an example of structured hierarchies used in conjunction with various embodiments of the present invention. After VoIP client 608 receives the XML namespace information, the VoIP client 606 transmits a set of data packets containing contextual information defined in accordance with the identified XML namespace or namespaces to VoIP client 608. When a namespace is present at a tag, its child elements share the same namespace in pursuant to the XML scope rule defined by XML 1.0 specification. As such, VoIP client 608 and VoIP client 606 can transmit contextual information without including prefixes in all the child elements, thereby reducing the amount of data packets transmitted for the contextual information.

With reference to FIGS. 8A-8E block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a call basics class 802, a call contexts class 810, a device type class 820, a VoIP client class 830 and the like.

Figure 8A:
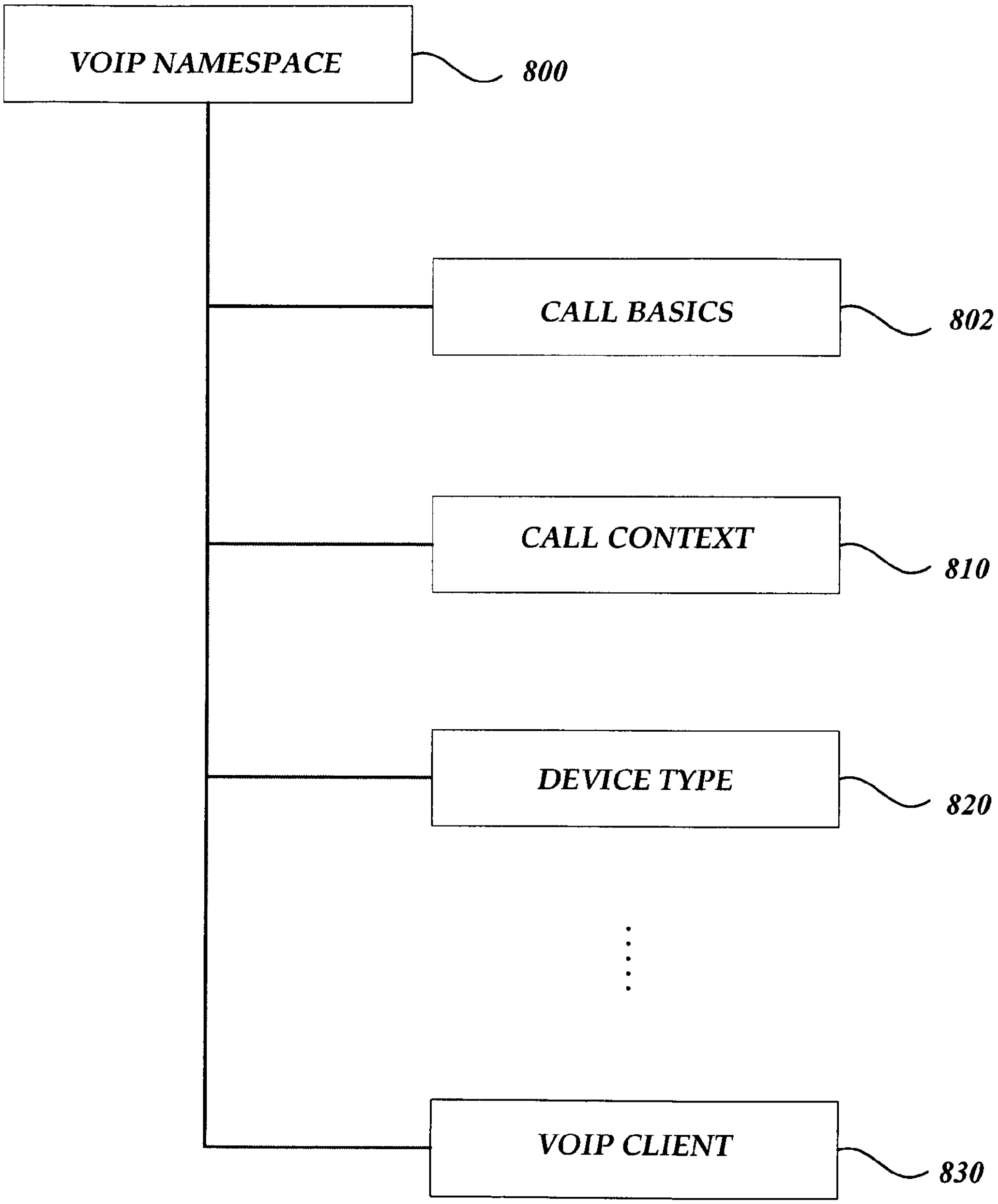
FIGS. 8A-8E are block diagrams illustrative of various attributes and classes of structured hierarchies corresponding to VoIP contextual information in accordance with an aspect of the present invention.
Figure 8B:
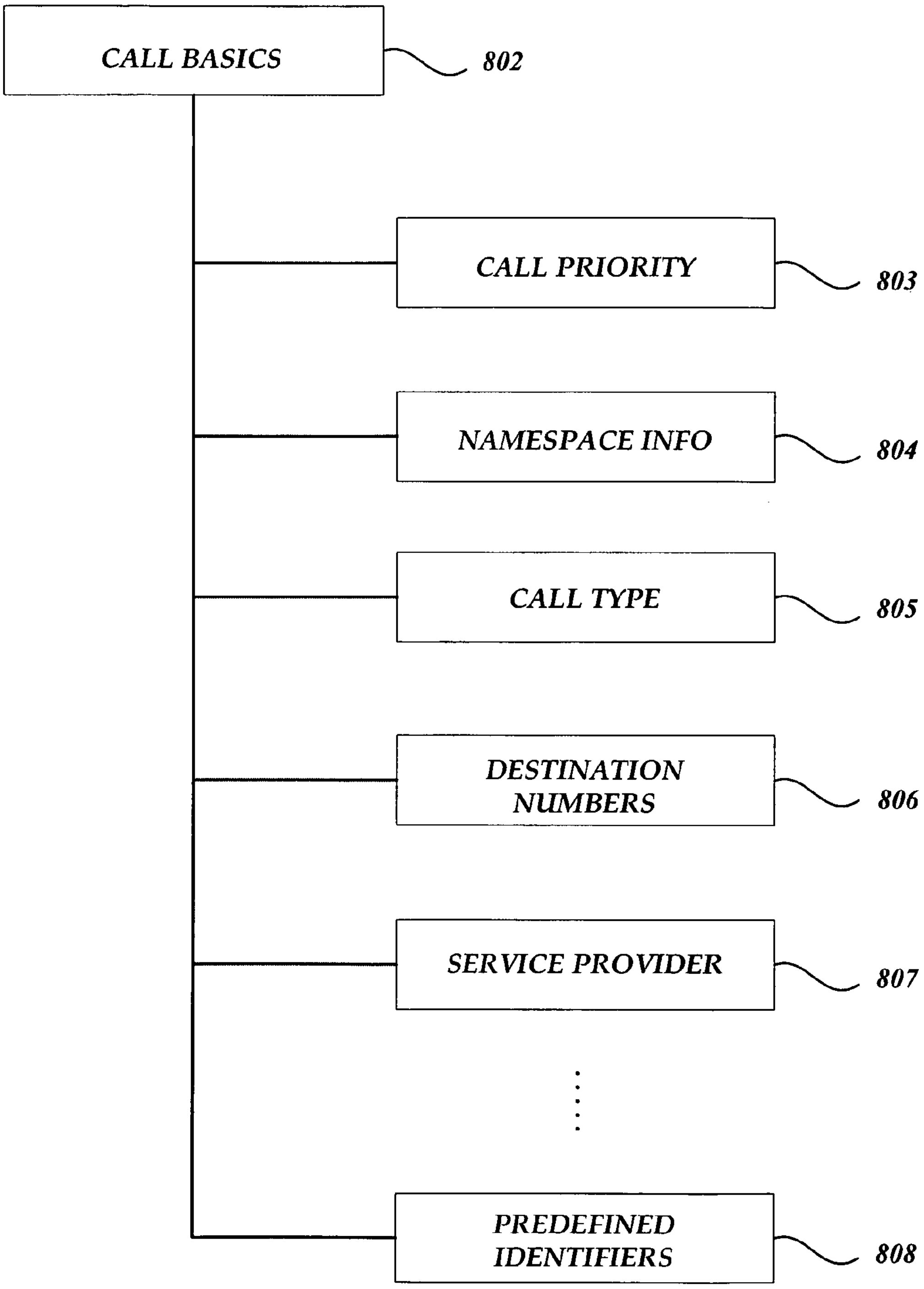

With reference to FIG. 8B, a block diagram of a call basics class 802 is shown. In an illustrative embodiment, call basics class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers that represent emotions, sounds (e.g., "ah", "oops", "wow", etc.) and facial expressions in graphical symbols. In one embodiment, a call basics class 802 may be defined as a sub-tree structure of a VoIP namespace 800 that includes nodes such as call priority 803, namespace information 804, call type 805, destination numbers 806, service provider 807, predefined identifiers 808, and the like.

Figure 8C:
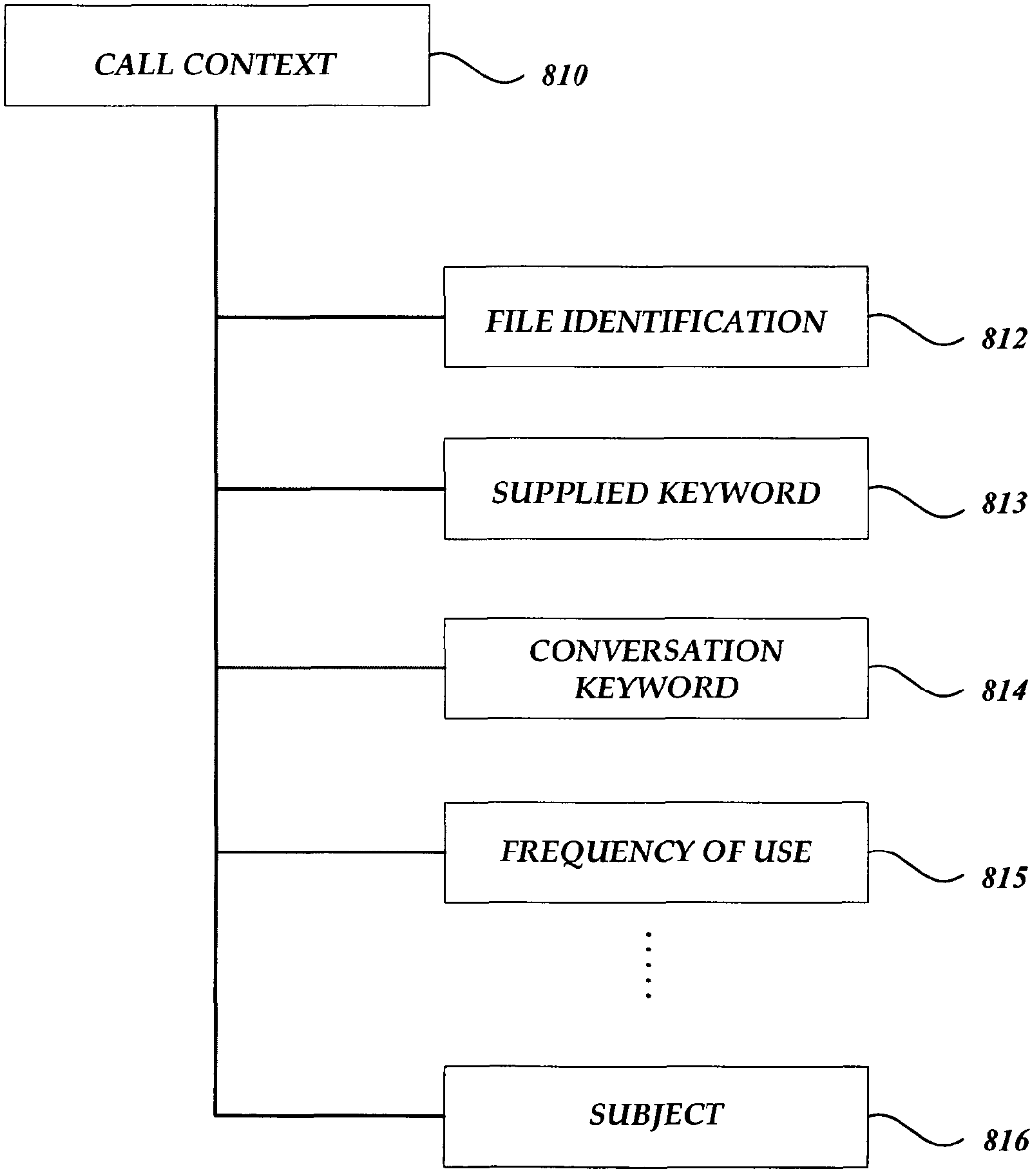

With reference to FIG. 8C, a block diagram of a call contexts class 810 is shown. In one embodiment, a subset of VoIP contextual information relating to conversation context may correspond to the call contexts class 810. The contextual information relating to conversation context may include information such as keywords supplied from a client, a service provider, a network, etc. The contextual information relating to conversation context may also include identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a call contexts class 810 may be defined as a sub-tree structure of a VoIP namespace 800 that includes nodes corresponding to file identification 812, supplied keyword 813, conversation keyword 814, frequency of use 815, subject of the conversation 816, and the like.

Figure 8D:
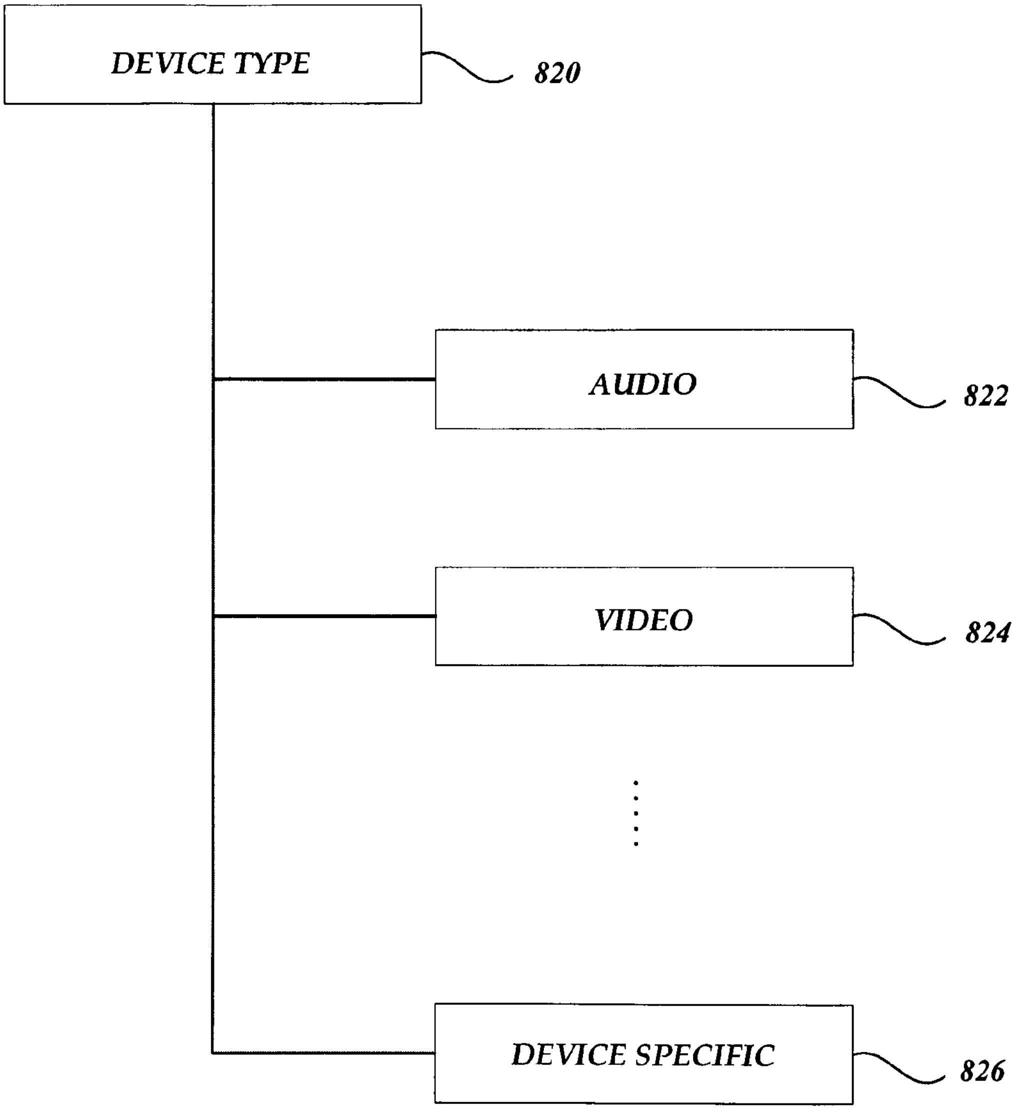

With reference to FIG. 8D, a block diagram of a device type class 820 is depicted. In one embodiment, a device type class 820 may correspond to a subset of VoIP contextual information relating to a VoIP client device (e.g., a recipient computing device, a sending computing device, etc.) used for the conversation channel connection. The subset of the VoIP contextual information relating to the VoIP client device may include audio related information that may be needed to process audio data generated by the VoIP client device. The audio related information may include information related to the device's audio functionality and capability, such as sampling rate, machine type, output/input type, microphone, digital signal processing (DSP) card information, and the like. The subset of the VoIP contextual information relating to the VoIP client device may include video related information that may be needed to process video data generated by the VoIP client device. The video related information may include resolution, refresh, type, and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a device type class 820 may be defined as a subtree structure of a VoIP namespace 800 that includes nodes corresponding to audio 822, video 824, device specific 826, and the like.

Figure 8E:
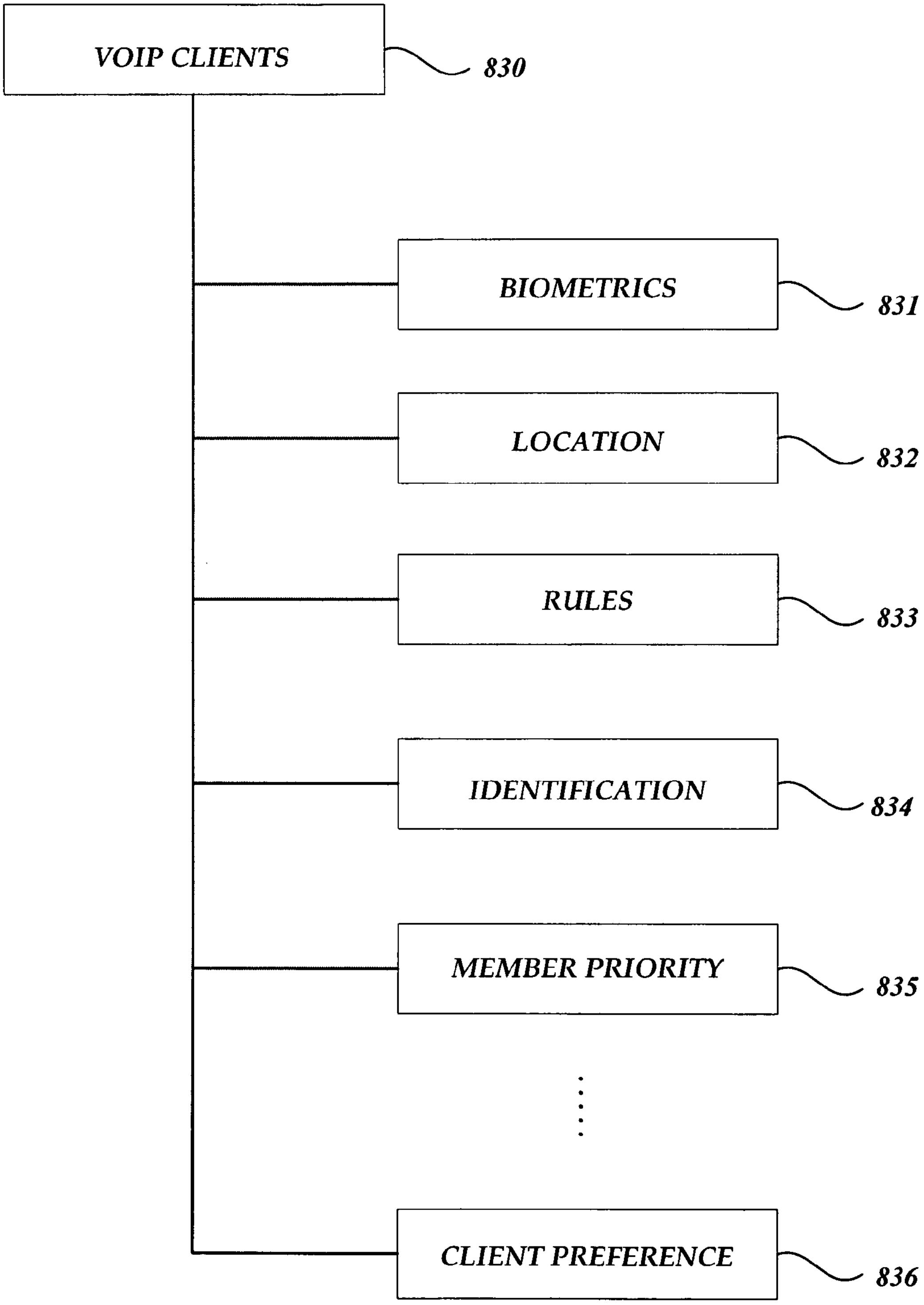

With reference to FIG. 8E, a block diagram of a VoIP client class 830 is depicted. In accordance with an illustrative embodiment, a VoIP client class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules (defined by the client, a service provider, a network, etc.), user preferences, client preferences, digital rights management (DRM), a member rank of an individual user in an organization, priority associated with the member rank, and the like. The priority associated with the member rank may be used to assign priority to the client for a conference call. In one embodiment, a VoIP client class 830 may be defined as a subtree structure of a VoIP namespace 800 that includes nodes corresponding to user biometrics 831, location 832, rules 833, user identification 834, member priority 835, client preference 836, and the like.

Figure 9:
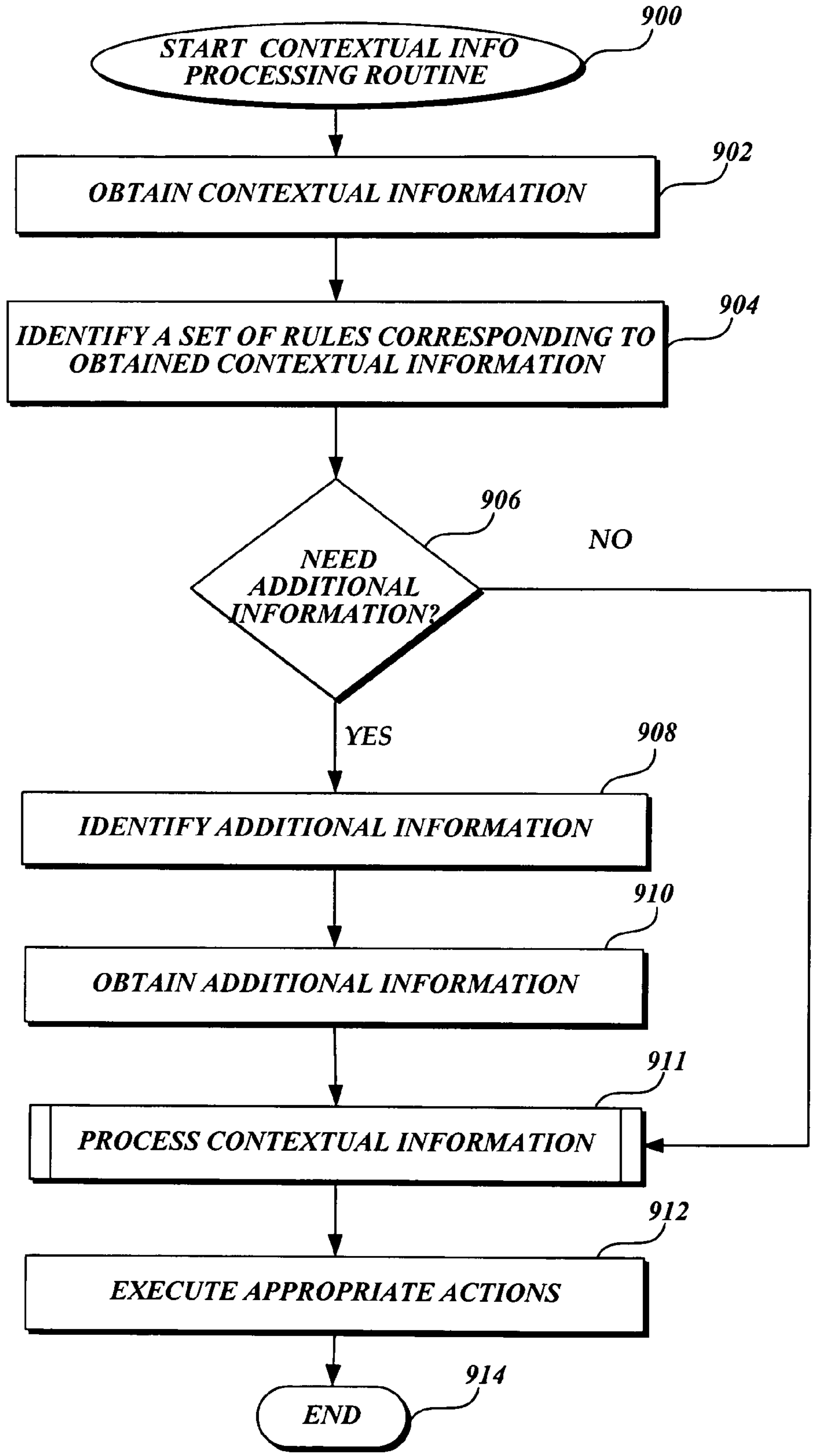
FIG. 9 is a flow diagram illustrating a contextual data processing routine for a recipient computing device in accordance with an aspect of the present invention.

FIG. 9 is a flowchart illustrating a routine 900 for processing contextual information in accordance with an embodiment of the present invention. In an illustrative embodiment, a device of a sending client (a sending computing device) may have requested its associated service provider to initiate a communication channel connection with a device of a recipient client (a recipient computing device).

Beginning at block 902, the recipient computing device may obtain contextual information from the sending computing device. It is to be understood that the sending client can be any VoIP entity that is capable of transmitting contextual information as part of a conversation. As described above, based on the content of the contextual information, the sending client identifies at least one structured hierarchy from predefined structured hierarchies, such as XML namespace and the like. The recipient computing device may further obtain the identified structured hierarchies from the device of the sending client. At block 904, upon receipt of the contextual information, the recipient computing device identifies a set of rules corresponding to the obtained contextual information. As discussed above, each recipient computing device may have a different set of rules that define how the contextual information is to be processed on the device. In one embodiment, a recipient client may have several different devices with different capabilities and functionalities and a set of rules may be defined such that each recipient computing device of the recipient client can process contextual information based on its capabilities and functionalities. For example, a simple landline telephone may not have applications or a screen to display media information which includes voice, video, and/or text information. In this example, the recipient client may specify a set of rules for the simple landline telephone (i.e., recipient computing device), indicating any media information will be forwarded to a personal computer of the recipient client or, in case the personal computer is not accessible, the media information will be stored to local storage of another device of the recipient client. In another example, the recipient client may specify a set of rules indicating that a recipient computing device will be operating as a by-passer during a certain time period although the recipient computing device has some capabilities and functionalities to process the received contextual information. In this example, the recipient computing device may not process but just forward all incoming contextual information to a destination specified by the set of rules during such time period. It is contemplated that the set of rules for each recipient computing device may have been predefined by the recipient client, service provider, or other authorized VoIP entity. It is further contemplated that the set of rules can be dynamically defined based on the time of day, geographic location of the recipient client, recipient client's mood, etc.

At decision block 906, a determination is made as to whether additional information needs to be obtained to apply the set of rules. If it is determined that additional information needs to be obtained, a source of the additional information is identified at block 908. For example, if the additional information is locally available, the additional information is retrieved from memory or storage of the recipient computing device. Otherwise, the additional information may be obtained from various sources (e.g., other devices of the recipient client, a service provider, a third party service provider, etc.). The additional information may be obtained from the source at block 910. In an illustrative embodiment, when there are multiple sources available for the additional information, the additional information may be collected and/or obtained from each of the multiple sources. Alternatively, the most appropriate source may be determined and contacted. The recipient computing device or the recipient client may have predefined rules or logic to determine an appropriate source for particular information.

Figure 10:
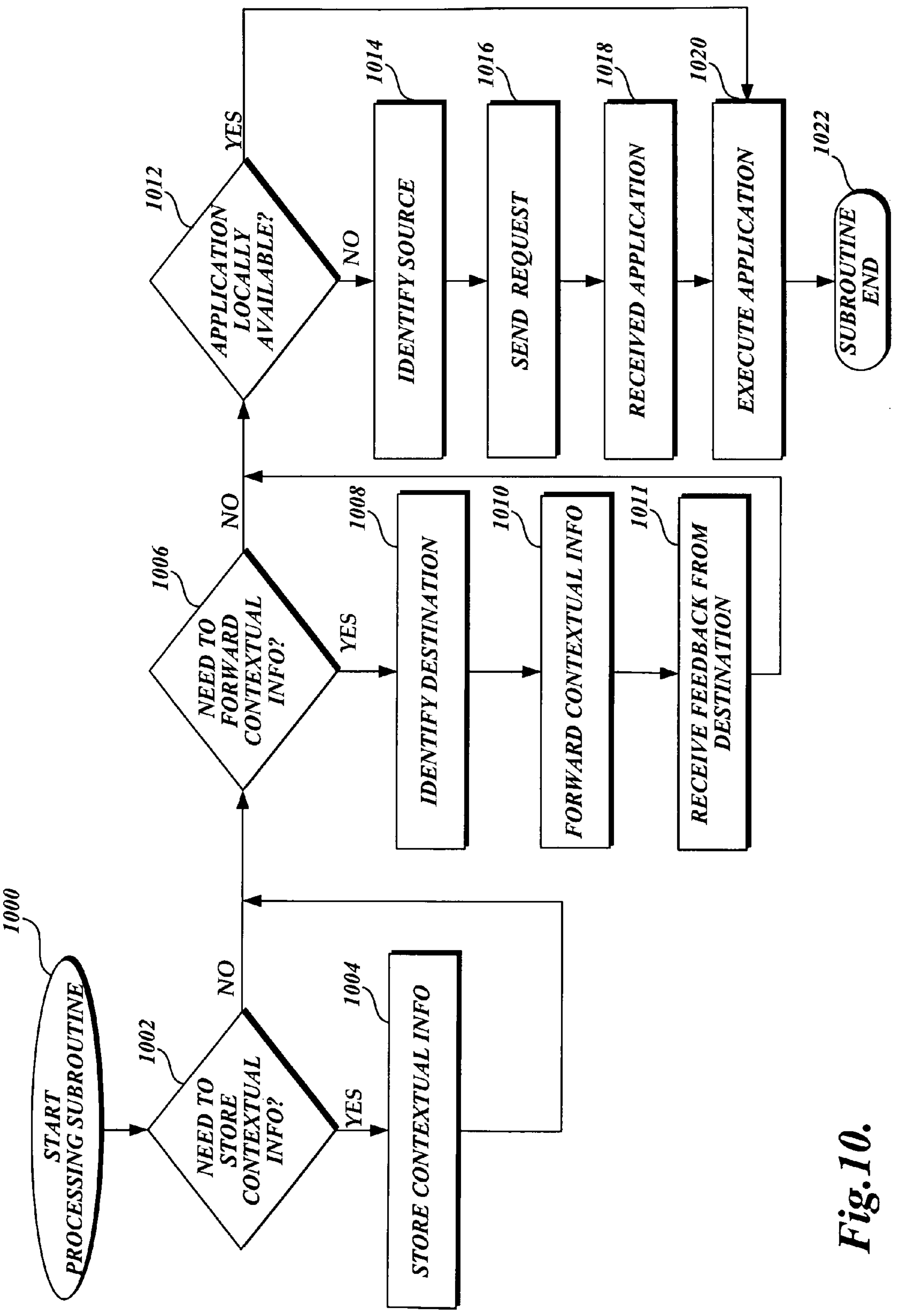
FIG. 10 is a flow diagram illustrating a processing contextual information subroutine utilized by the contextual data processing routine for processing the contextual information accordance with a set of rules in accordance with an aspect of the present invention.

After obtaining the additional information (block 910), or if it is determined that additional information does not need to be obtained (decision block 906), at block 911, the contextual information may be processed according to the set of rules in processing subroutine 1000 (see FIG. 10). At block 912, if necessary, the recipient computing device may further execute appropriate actions on the processed contextual information. In one embodiment, the recipient computing device may send responding contextual information based on the processed contextual information to the sending computing device. In another embodiment, the recipient computing device may store log information about processing of contextual information. The recipient client may utilize the log information to update the contextual information processing rules. The routine 900 terminates at block 914.

It is to be understood that the embodiments explained in conjunction with the routine 900 are provided merely for example purposes. It is contemplated that the routine 900 can also be performed by the device of a sending client, a service provider, or a third party service provider that is capable of receiving contextual information and applying a set of contextual information processing rules. It is further contemplated that the contextual information may be processed according to a set of contextual information processing rules at any time, including before establishing a communication channel (e.g., during a connection set-up phase), during a conversation, or after terminating a communication channel. Moreover, contextual information processing rules can be dynamically updated by an authorized VoIP entity at any time. Further, contextual information processing rules can be periodically updated. It is also contemplated that any authorized VoIP entity in the IP environment 100 can exchange contextual information with the recipient computing device over a communication channel established between the sending computing device and the recipient computing device.

For the purpose of discussion, assume a scenario where a first client using a device with limited functionalities for example a mobile phone, is communicating with a second client. During a conversation, the second client may send contextual information including presentation material related to the conversation to the first client. The mobile phone which the first client is currently using for the communication channel does not have a software application, or other capabilities, to display the presentation material. The first client has specified contextual information processing rules for the mobile phone, indicating that the presentation material will be forwarded to a personal computer when the mobile phone receives such contextual information. Likewise, the first client has specified contextual information processing rules for the personal computer indicating that upon receipt, presentation application PPP will be utilized to display the presentation material.

Upon receipt of the presentation material, the mobile phone forwards the presentation material to the designated personal computer. Subsequently, the personal computer processes the received presentation material and displays the presentation material on its screen. The first client can continue the conversation using the mobile phone while watching the presentation on a different device (i.e., a personal computer). It is to be understood that there is no communication connection established between the personal computer and the second client. Alternatively, the mobile phone may search for a proper device of the first client that is currently available and capable of displaying the instant presentation material. During a search, the mobile phone may temporarily store the presentation material in local storage while the search is in progress. Following a successful search, the presentation material will be forwarded to the located device of the first client.

FIG. 10 is a flowchart illustrating a subroutine 1000 for processing contextual information upon receipt, in accordance with an embodiment of the present invention. In an illustrative embodiment, a device of a sending client (a sending computing device) may have established a communication channel connection with one of the devices of a recipient client (a recipient computing device). As with FIG. 9, for the purpose of discussion, assume that the recipient computing device may have received contextual information and identified its corresponding set of rules which has been specified to process the received contextual information.

At decision block 1002, a determination is made as to whether the set of rules indicates that the recipient commuting device should store either subsets, or all of the contextual information. If it is determined that subsets, or all of the contextual information will be stored on the recipient commuting device at decision block 1002, at block 1004, subsets, or all of the contextual information are stored in local storage in accordance with the set of rules. The set of rules can be specified to instruct the recipient computing device where to store incoming contextual information. In one embodiment, the recipient computing device does not have enough local storage to store the contextual information. Instead, the recipient client may have a designated repository for storing contextual information that is received by devices of the recipient client. In this embodiment, the recipient computing device may determine a destination designated repository and store the received contextual information accordingly.

Alternatively, the set of rules may indicate that the recipient computing device generates a request to store the contextual information and forwards the request and the contextual information to other devices of the recipient client. Based on the set of rules, the received contextual information may be stored on other devices of the recipient client. At decision block 1006, a determination is made as to whether the received contextual information may not be processed but forwarded. If it is determined at decision block 1006 that the received contextual information is to be forwarded, at block 1008 a proper destination may be identified. At block 1010, the contextual information may be forwarded to the identified destination. In one embodiment, the identified set of rules may include information relating to a designated destination of the contextual information to be forwarded. In another embodiment, the identified set of rules may indicate that all incoming contextual information received by the recipient computing device is to bypass the recipient computing device. In this embodiment, upon receipt of contextual information, the recipient computing device forwards the contextual information to a next destination in a communication channel path. For example, a third party service provider may not desire to process contextual information received from a group of sending clients associated with a particular service provider. In this example, the third party service provider may have a set of contextual information processing rules indicating that all incoming contextual information from the sending clients associated with the particular service provider will be forwarded, upon receipt of contextual information. At block 1011, the recipient computing device may receive some feedback from the identified destination in response to the forwarded contextual information. In one embodiment, the feedback may be a confirmation of the request. In another embodiment, the feedback may include processed contextual information on which the recipient computing device can apply its resident applications.

If it is determined at decision block 1006 that the received contextual information is not to be forwarded or some feedback has been received at block 1011, at decision block 1012, a determination is made as to whether an appropriate application to execute on the contextual information is locally available. If the appropriate application is not locally available, the recipient computing device may identify a source to obtain the appropriate application as illustrated at block 1014. At block 1016, the recipient computing device may send a request to the source. The recipient computing device may obtain the appropriate application from the source at block 1018. After obtaining the appropriate application from the source (1018), or if it is determined that the appropriate application is locally available (1020), the recipient computing device executes the appropriate application on the contextual information in accordance with the set of processing rules, as illustrated at block 1020. In an illustrative embodiment, the recipient computing device may identify a device of the recipient client which is capable of processing the contextual information. The recipient computing device may request the identified device to process the contextual information and to generate a suitable output that the recipient computing device can further process. After forwarding the contextual information (block 1010) or executing the appropriate application (at decision block 1020), the subroutine 1000 returns back to the routine 900 and ends at block 1022.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for processing contextual information relating to a conversation between a first Voice over Internet Protocol (VoIP) client and a second VoIP client, comprising:

initializing a conversation channel between the first VoIP client and the second VoIP client, wherein the conversation channel is used to exchange contextual data packets and conversational data packets between a user device of the first VoIP client and a user device of the second VoIP client during a conversation, wherein the first VoIP client and the second VoIP client specify rules to process contextual information that depends on a type of device employed by a user during the conversation, wherein devices having different rules have different capabilities;

obtaining contextual information from the contextual data packets during the conversation at one or more of: the first VoIP client and the second VoIP client, wherein the contextual information comprises data structured hierarchies;

upon obtaining the contextual information at the one or more of: the first VoIP client and the second VoIP client, identifying a set of rules to process the contextual information at a receiving VoIP client selected from the first VoIP client and the second VoIP client based on the type of device employed by the receiving VoIP client, wherein the set of rules has been predefined, and wherein the set of rules comprise at least one rule for the receiving VoIP client to process the contextual information, otherwise transfer the contextual information to a different device; and processing the contextual information during the conversation by applying the set of rules to the contextual information.

2. The method of claim 1 further comprising:

identifying additional information that is needed to apply the set of rules; and obtaining the additional information.

3. The method of claim 1, wherein processing the contextual information includes storing a subset of the contextual information in local storage of the recipient computing device.

4. The method of claim 1, wherein processing the contextual information includes identifying a destination repository, generating a request to store the contextual information, and forwarding the contextual information and the request to the destination repository.

5. The method of claim 1, wherein processing the contextual information includes identifying an appropriate application and executing the identified appropriate application on the contextual information.

6. The method of claim 5, wherein processing the contextual information includes obtaining the identified application from a proper source if the identified application is not locally available on the recipient computing device.

7. The method of claim 1, wherein processing the contextual information includes forwarding the contextual information to a next destination in a predetermined communication path.

8. The method of claim 1, wherein processing the contextual information includes updating the contextual information in accordance with the set of rules.

9. The method of claim 1, wherein processing the contextual information includes retrieving previously obtained contextual information and applying the set of rules to the retrieved contextual information.

10. A memory having computer-executable components for processing contextual information relating to a conversation on a communication channel comprising:

a communication component for initializing a conversation channel between a first VoIP client and a second VoIP client, wherein the conversation channel is used to exchange contextual data packets and conversational data packets between a user device of the first VoIP client and a user device of the second VoIP client during a conversation; wherein the first VoIP client and the second VoIP client specify rules to process contextual information that depends on a type of device employed by a user during the conversation, wherein devices having different rules have different capabilities;

a communication component for receiving contextual information during the conversation and for forwarding the received contextual information, wherein the contextual information comprises data structured hierarchies;

a processing component, using a processor on at least one of the first VoIP client and the second VoIP client for identifying a set of rules relating to processing the received contextual information and for applying the set of rules on the received contextual information, wherein the set of rules comprise at least one rule for the processing component to process the contextual information, otherwise transfer the contextual information to a different device; and a storage component for storing the set of rules and subsets of the received contextual information.

11. The memory of claim 10, wherein the processing component identifies an appropriate application based on the set of rules and executes the appropriate application on the contextual information.

12. The memory of claim 11, wherein the communication component obtains the appropriate application from a proper source if the appropriate application is not locally available.

13. The memory of claim 11, wherein the processing component executes appropriate actions on an existing communication channel connection in accordance with the set of rules.

14. The memory of claim 11, wherein the processing component determines whether additional information is necessary to apply the set of rules on the contextual information and, upon determination, the communication component obtains the additional information.

15. The memory of claim 11, wherein the storage component stores the processed contextual information and log information about the processing.

16. A method for processing contextual information exchange as part of a conversation over a communication channel in accordance with predefined rules, comprising:

initializing a conversation channel between a first VoIP client and a second VoIP client, wherein the conversation channel is used to exchange contextual data packets and conversational data packets between the first VoIP client and the second VoIP client during the conversation; wherein the first VoIP client and the second VoIP client specify rules to process contextual information that depends on a type of device employed by a user during the conversation;

receiving contextual information, wherein the contextual information comprises data structured hierarchies;

upon receipt of the contextual information at one or more of: the first VoIP client and the second VoIP client, determining whether a process on the contextual information is necessary; and upon determination that a process on the contextual information is necessary, identifying a set of rules corresponding to the process on the contextual information and processing the contextual information according to the set of rules;

wherein the set of rules is individually defined for a recipient computing device of the contextual information, and wherein the set of rules comprise at least one rule for the recipient computing device to process the contextual information, otherwise transfer the contextual information to a different device.

17. The method of claim 16 further comprising:

forwarding the contextual information to a next destination.

18. The method of claim 16 further comprising:

storing the contextual information in at least one of local storage or a centralized repository.

19. The method of claim 16, wherein the set of rules is dynamically updated.

20. The method of claim 16, wherein processing the contextual information includes:

if an appropriate application to process the contextual information is not locally available, identifying a proper computing device that has an appropriate application to process the contextual information;

transmitting a request to process the contextual information and the contextual information to the identified computing device; and receiving the processed contextual information from the identified computing device.

* * * * *